(12) United States Patent
Hidaka et al.

(10) Patent No.: US 9,047,416 B2
(45) Date of Patent: Jun. 2, 2015

(54) COMMUNICATION CONTROL SYSTEM, SWITCHING NODE, COMMUNICATION CONTROL METHOD AND COMMUNICATION CONTROL PROGRAM INCLUDING PCI EXPRESS SWITCH AND LAN INTERFACE

(75) Inventors: Youichi Hidaka, Tokyo (JP); Masashi Hayashi, Tokyo (JP); Shihomi Sato, Tokyo (JP); Tsugio Okamoto, Tokyo (JP); Takashi Yokota, Tokyo (JP); Masanori Takashima, Tokyo (JP); Koichi Tsuchiya, Tokyo (JP); Minaxay Philavong, Tokyo (JP); Tetsu Izawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 13/580,620

(22) PCT Filed: Feb. 18, 2011

(86) PCT No.: PCT/JP2011/053569
§ 371 (c)(1),
(2), (4) Date: Dec. 12, 2012

(87) PCT Pub. No.: WO2011/102488
PCT Pub. Date: Aug. 25, 2011

(65) Prior Publication Data
US 2013/0086295 A1    Apr. 4, 2013

(30) Foreign Application Priority Data
Feb. 22, 2010   (JP) ................................ 2010-036416

(51) Int. Cl.
*G06F 13/40* (2006.01)
*H04L 12/24* (2006.01)
*H04L 12/931* (2013.01)

(52) U.S. Cl.
CPC ............ *G06F 13/4022* (2013.01); *H04L 41/00* (2013.01); *H04L 49/35* (2013.01)

(58) Field of Classification Search
CPC .............. G06F 13/385; G06F 13/4022; G06F 13/4027; G06F 2213/0042; G06F 13/387
USPC ........................................................ 710/313
See application file for complete search history.

(56) References Cited

U.S. PATENT DOCUMENTS 6,253,271 B1 *  6/2001  Ram et al. ...................... 710/306
(Continued)

FOREIGN PATENT DOCUMENTS

CN           1356806 A     7/2002
(Continued)

OTHER PUBLICATIONS

Suzuki, J.; Hayashi, Y.; Kan, M.; Miyakawa, S.; Yoshikawa, T., "End-to-End Adaptive Packet Aggregation for High-Throughput I/O Bus Network Using Ethernet," High-Performance Interconnects (HOTI), 2014 IEEE 22nd Annual Symposium on , pp. 17-24, Aug. 26-28, 2014.*

(Continued)

*Primary Examiner* — Faisal M Zaman
(74) *Attorney, Agent, or Firm* — McGinn IP Law Group, PLLC (57) ABSTRACT

In a switching node, high-speed and advanced service protocol processing function is achieved by utilizing an external control server without affecting performance of conventional service protocol processing. Specifically, a forwarding engine has PCI express and an LAN interface. Depending on a type of an input packet, destination of the packet is switched to the PCI express side for conventional network service and to the LAN interface side for extended network service that cooperates with the external control server. A CPU having the PCI express and the LAN interface is provided ahead of the LAN interface. The CPU performs communication of service inquiry with the external control server at high speed via the LAN interface. After response from the control server is obtained, setting of the forwarding engine is performed through the PCI express.

13 Claims, 7 Drawing Sheets

(56) References Cited

U.S. PATENT DOCUMENTS

| | | | |
|---|---|---|---|
| 7,058,738 B2 | 6/2006 | Stufflebeam, Jr. | |
| 7,188,209 B2* | 3/2007 | Pettey et al. | 710/317 |
| 7,274,706 B1* | 9/2007 | Nguyen et al. | 370/419 |
| 7,480,303 B1* | 1/2009 | Ngai | 370/395.5 |
| 8,041,875 B1* | 10/2011 | Shah et al. | 710/316 |
| 8,683,110 B2* | 3/2014 | Suzuki et al. | 710/314 |
| 2004/0030745 A1* | 2/2004 | Boucher et al. | 709/203 |
| 2004/0243723 A1* | 12/2004 | Davis et al. | 709/250 |
| 2005/0240745 A1* | 10/2005 | Iyer et al. | 711/167 |
| 2005/0246460 A1 | 11/2005 | Stufflebeam | |
| 2006/0095567 A1* | 5/2006 | Biran et al. | 709/224 |
| 2007/0118665 A1* | 5/2007 | Philbrick et al. | 709/230 |
| 2007/0198763 A1 | 8/2007 | Suzuki et al. | |
| 2008/0013448 A1* | 1/2008 | Horie et al. | 370/229 |
| 2008/0025289 A1* | 1/2008 | Kapur et al. | 370/351 |
| 2008/0071961 A1 | 3/2008 | Higuchi et al. | |
| 2008/0291324 A1* | 11/2008 | Hong et al. | 348/484 |
| 2008/0304481 A1* | 12/2008 | Gurney et al. | 370/389 |
| 2009/0006710 A1* | 1/2009 | Daniel et al. | 710/315 |
| 2009/0116398 A1* | 5/2009 | Shi et al. | 370/252 |
| 2009/0222564 A1* | 9/2009 | Freimuth et al. | 709/228 |
| 2010/0002714 A1* | 1/2010 | George et al. | 370/402 |
| 2010/0082875 A1* | 4/2010 | Sato | 710/316 |
| 2010/0180062 A1 | 7/2010 | Hidaka et al. | |
| 2011/0029734 A1* | 2/2011 | Pope et al. | 711/118 |
| 2011/0206051 A1* | 8/2011 | Suzuki | 370/392 |

FOREIGN PATENT DOCUMENTS

| | | | | |
|---|---|---|---|---|
| CN | 1620047 A | | 5/2005 | |
| CN | 1694079 A | | 11/2005 | |
| CN | 101501660 | | 8/2009 | |
| CN | 102821082 A | * | 12/2012 | H04L 29/06 |
| CN | 103036817 A | * | 4/2013 | H04L 12/931 |
| CN | 103595648 A | * | 2/2014 | H04L 12/803 |
| CN | 103596649 A | * | 2/2014 | A99Z 99/00 |
| EP | 1 591 910 A1 | | 11/2005 | |
| JP | 2005-317021 A | | 11/2005 | |
| JP | 2006-202210 A | | 8/2006 | |
| JP | 2007-219873 A | | 8/2007 | |
| JP | 2008-078887 A | | 4/2008 | |
| KR | 10-2006-0045489 A | | 5/2006 | |
| KR | 20120012354 A | * | 2/2012 | H04L 12/28 |
| WO | WO 2014089980 A1 | * | 6/2014 | H04L 12/931 |
| WO | WO 2014094529 A1 | * | 6/2014 | H04L 12/24 |

OTHER PUBLICATIONS

Daniel, D.A.; Hui, J.Y., "Virtualization of Local Computer Bus Architectures Over the Internet," Global Telecommunications Conference, 2007. GLOBECOM '07. IEEE , pp. 1884-1889, Nov. 26-30, 2007.*

Bencivenni, M.; Carbone, A.; Fella, A.; Galli, D.; Marconi, U.; Peco, G.; Perazzini, S.; Vagnoni, V.; Zani, S., "High rate packet transmission on 10 Gbit/s Ethernet LAN using commodity hardware," Real Time Conference, 2009. RT '09. 16th IEEE-NPSS , pp. 167-182, May 10-15, 2009.*

Suzuki, J.; Hidaka, Y.; Higuchi, J.; Yoshikawa, T.; Iwata, A., "ExpressEther—Ethernet-Based Virtualization Technology for Reconfigurable Hardware Platform," High-Performance Interconnects, 14th IEEE Symposium on , pp. 45-51, Aug. 23-25, 2006.*

Korean Office Action dated Oct. 25, 2013, with English translation.

Extended European Search Report dated Aug. 27, 2013.

"Open Flow Switch Specification Version 1.0.0 (Wire Protocol 0X01) Dec. 31, 2009" http://www.openflowswitch.org/documents/openflow-spec-v1.0.0.pdf (Previously filed on Aug. 24, 2012).

Chinese Office Action dated Apr. 22, 2014, with English translation.

International Search Report in PCT/JP2011/053569 dated May 17, 2011 (English translation thereof).

"Open Flow Switch Specification Version 1.0.0 (Wire Protocol 0X01) Dec. 31, 2009" <http://www.openflowswitch.org/documents/openflow-spec-v1.0.0.pdf>.

"The Open Flow Switch Consortium" <http://www.openflowswitch.org/>.

Taiwanese Office Action dated Oct. 21, 2013, with English translation.

* cited by examiner

Fig. 1

Related Art

Fig. 2

Related Art

COMMUNICATION CONTROL SYSTEM, SWITCHING NODE, COMMUNICATION CONTROL METHOD AND COMMUNICATION CONTROL PROGRAM INCLUDING PCI EXPRESS SWITCH AND LAN INTERFACE

TECHNICAL FIELD

The present invention relates to a communication control system, and in particular, a frame-receiving interface separated-type communication control system.

BACKGROUND ART

In recent years, an interface (I/F) called as a "PCI express (PCI Express)" has been widely used in place of a PCI bus (Peripheral Component Interconnect bus). The PCI bus adopts a parallel transfer method, while the PCI express (PCI Express) adopts a serial transfer method. Although compatibility between the PCI bus and the PCI express (PCI Express) at physical level does not exists, communication protocol and so on are commonly used. In a transmission path (lane) with minimum configuration, which is used in the PCI express (PCI Express), full-duplex communication of 2.5 Gbps (Gigabit per second) in one-way and 5.0 Gbps in two-way is possible.

Figure 1:
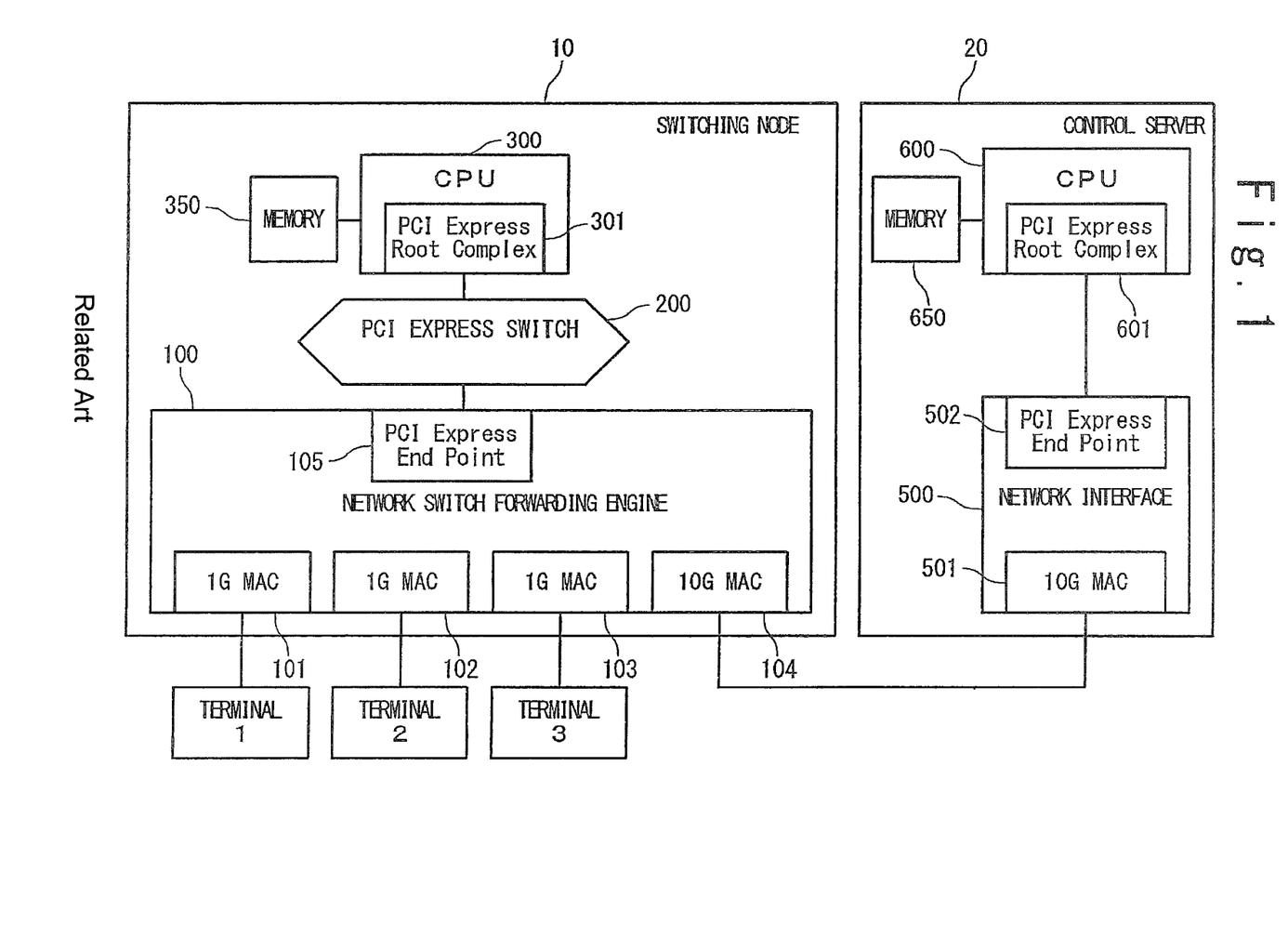
FIG. 1 is a conceptual view showing an example of a conventional system configuration.

FIG. 1 shows an example of a conventional system configuration in executing an extended network service by a control server (controller). In the conventional system, only one CPU (Central Processing Unit) exists on the switching node, and processing related to all service protocols is executed in cooperation with the control server via the PCI express (PCI Express) as a serial transfer interface used to connect a network switch forwarding engine.

Figure 2:
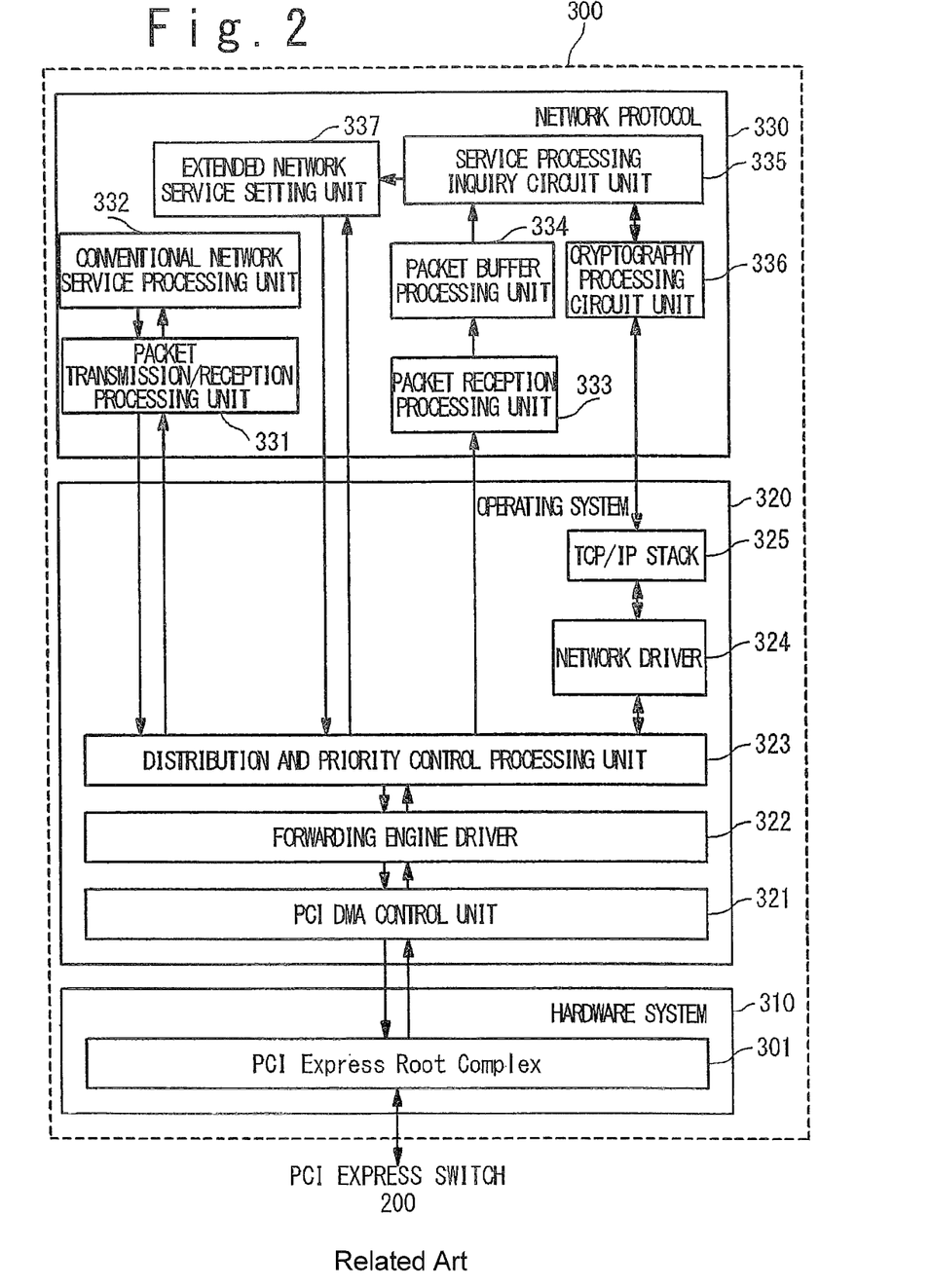
FIG. 2 is a conceptual view showing an example of a configuration of a CPU on a conventional switching node.

FIG. 2 shows an example of a configuration of the CPU on the conventional switching node. A module of processing related to the extended network service executed by the external control server and a module of processing related to a locally executed conventional network service are executed on the CPU as network protocol processing on an operating system.

In the software stack configuration configured on the conventional CPU as shown in FIG. 2, since only one CPU exists, the one CPU must address both the processing related to the conventional network service and the processing related to the extended network service.

Further, in the conventional system configuration, the PCI express (PCI Express) is an only interface between internal modules (CPU) and an external connection device (network switch forwarding engine) and therefore, internal modules struggle for resources, which requires distribution and priority control processing.

Further, since the PCI express (PCI Express) causes overhead at transmission/reception of a packet, high-speed packet transmission/reception cannot be disadvantageously achieved.

Moreover, when control of the PCI express (PCI Express) is delayed, overflow of a CPU-destined packet queue in the network switch forwarding engine, disposition of the packet and decline in the service quality occur.

Due to the above-mentioned problems, the conventional system configuration is configured on the assumption of processing related to the service protocol having a light load on the control interface and therefore, cannot realize a configuration that needs high-speed packet transmission/reception with the external control server.

Patent literature 1 (JPA 2005-317021) described PCI express (PCI Express). For example, a topology for the PCI express (PCI Express) included in a computing device includes a host bridge and some end points (that is, an I/O device) in addition to the CPU and a memory. The plurality of points are connected by means of a switch.

As a related technique, Patent literature 2 (JPA 2006-202210) discloses an information processing device, and a service publication method and a program. According to the related technique, a UPnP (Universal Plug and Play) device announces the existence of the device (the equipment) to a UPnP control point according to an SSDP (Simple Service Discovery Protocol), and publicizes device description and service description, which are described in an XML (Extensible Markup Language) format. The UPnP control point finds UPnP device and service according to the SSDP, and controls an action of each service by a call based on an SOAP (Simple Object Access Protocol). A change of a state of the UPnP service is notified to the UPnP control point that reads an event notification based on a GENA (Generic Event Notification Architecture).

As a related technique, Patent literature 3 (JPA 2007-219873) discloses a switch and a network bridge device. According to the related technique, a route complex receives a command from a CPU and transfers peer to peer communication between the CPU and a peripheral device, and peer to peer communication between a memory and the peripheral device. At this time, the route complex and the peripheral device are communicated with each other by using a packet (TLP: Transaction Layer Packet) of the PCI express (PCI Express).

CITATION LIST

Patent Literature

Patent literature 1: JPA 2005-317021
Patent literature 2: JPA 2006-202210
Patent literature 3: JPA 2007-219873

Non Patent Literature

Non-patent literature 1: "The Open Flow Switch Consortium"<http://www.openflowswitch.org/>
Non-patent literature 2: "Open Flow Switch Specification Version 1.0.0 (Wire Protocol 0X01) Dec. 31, 2009"<http://www.openflowswitch.org/documents/openflow-spec-v1.0.0.pdf>

SUMMARY OF INVENTION

According to a configuration of a conventional network switching node, a data forwarding part and a controlling part for controlling the data forwarding part are connected with each other through a PCI express (PCI Express) or another local bus interface. However, in the case of the PCI and the like, flow of control information is presupposed and thus to perform high-speed data transfer causes problem of performance of an interface between the data forwarding side and the controlling side.

Moreover, in recent years, increase in data transfer capacity and advanced service control are required. It is therefore necessary to improve the performance of the interface between the data forwarding part and the controlling part, in order to achieve advanced and high-speed processing with keeping the conventional service performance.

A communication control system according to the present invention includes: a switching node configured to execute conventional network service; and a control server (controller) configured to execute extended network service. The switching node has: a first internal bus (PCI express and the like) used for forwarding a frame for internal processing; a second internal bus (LAN interface and the like) for forwarding a frame for external transmission; and a forwarding engine (network switch forwarding engine). The forwarding engine operates depending on a type of an input frame, forwards a frame regarding the conventional network service to the first internal bus for internal processing in the switching node, and forwards a frame regarding the extended network service to the second internal bus for utilizing the control server.

A switching node according to the present invention has: a first internal bus used for forwarding a frame for internal processing; a second internal bus for forwarding a frame for external transmission; and a forwarding engine configured to operate depending on a type of an input frame, to forward a frame regarding conventional network service to the first internal bus for internal processing, and to forward a frame regarding the extended network service to the second internal bus for utilizing an external control server.

In a communication control method according to the present invention, a type of an input frame is checked by a forwarding engine of a switching node. If the input frame is a frame regarding conventional network service, the input frame is forwarded to a first internal bus for internal processing in the switching node. If the input frame is a frame regarding extended network service, the input frame is forwarded to a second internal bus for utilizing an external control server.

A communication control program according to the present invention is a program that causes a switching node to execute processing including: checking, by a forwarding engine of a switching node, a type of an input frame; forwarding, if the input frame is a frame regarding conventional network service, the input frame to a first internal bus for internal processing in the switching node; and forwarding, if the input frame is a frame regarding extended network service, the input frame to a second internal bus for utilizing an external control server. It should be noted that the communication control program according to the present invention can be stored in a storage device or a recording medium.

Since the PCI express (PCI Express) used in the conventional network service is not used, high-speed packet transmission/reception is possible and therefore, the advanced and high-speed network service that cooperates with the control server becomes feasible.

DESCRIPTION OF EMBODIMENTS

Embodiment

An embodiment of the present invention will be described below referring to appended figures.

[Basic Configuration]

Figure 3:
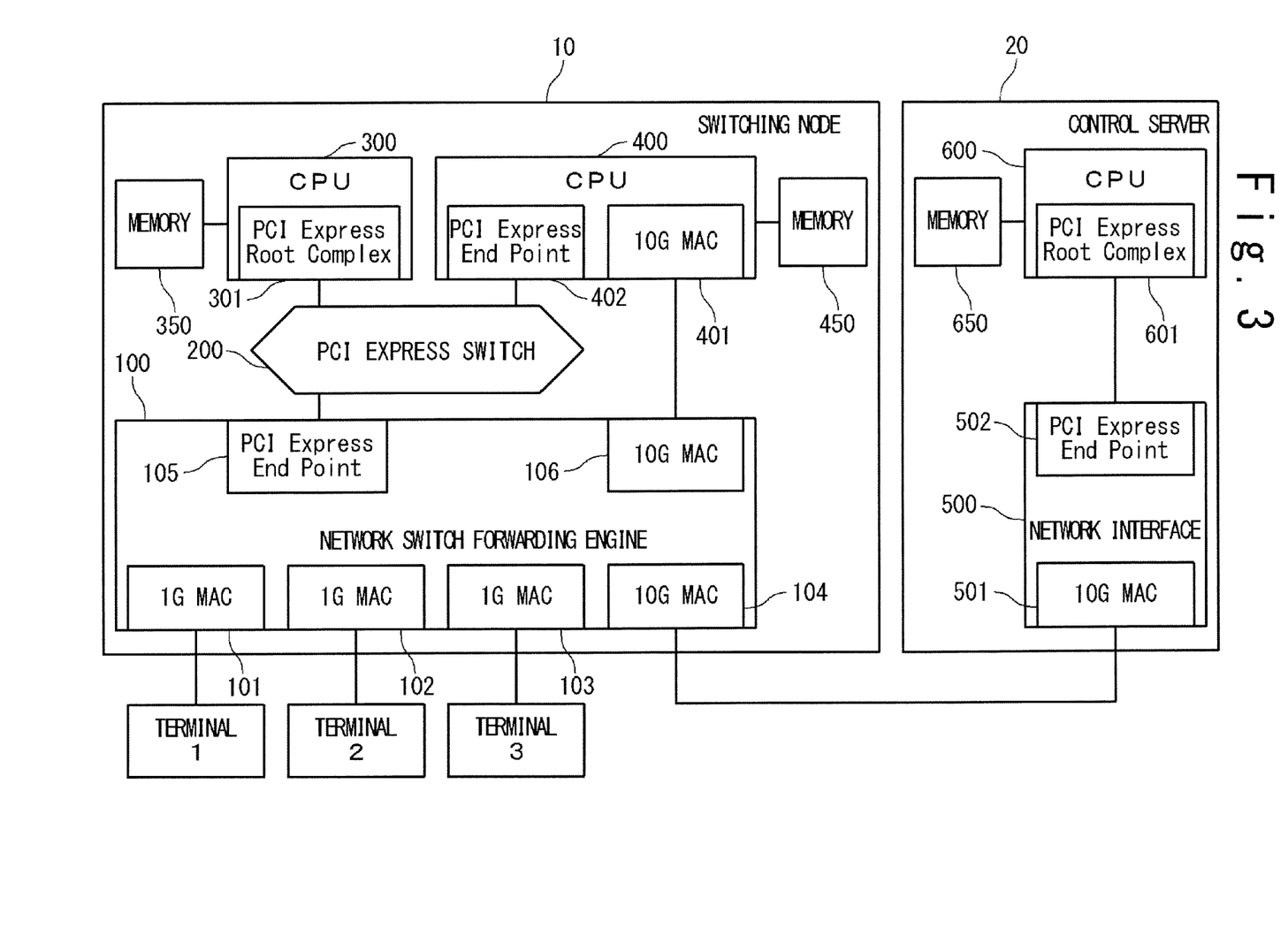
FIG. 3 is a conceptual view showing an example of a basic configuration of a communication control system of the present invention.

As shown in FIG. 3, a communication control system of the present invention includes a switching node 10 and a control server (controller) 20.

The switching node 10 is connected to terminals 1 to 3 (a terminal 1, a terminal 2 and a terminal 3) and the control server 20 via a network. Here, for simplification of description, only the terminals 1 to 3 and the control server 20 are shown as objects connected to the switching node 10, but other server and switching node may be connected to the switching node 10. The control server 20 executes the extended network service for the switching node 10. A plurality of switching nodes 10 and a plurality of control servers 20 may be provided.

The switching node 10 includes a network switch forwarding engine 100, a PCI express (PCI Express) switch 200, a CPU 300, a memory 350, a CPU 400 and a memory 450.

The network switch forwarding engine 100 executes forwarding processing of frames input from the terminals 1 to 3. The PCI express (PCI Express) switch 200 transmits/receives the frame or a control command between the network switch forwarding engine 100 and the CPU 300 or the CPU 400. The PCI express (PCI Express) switch 200 may be incorporated into the network switch forwarding engine 100.

The frame is a common name of a PDU (protocol data unit) used in communication at a second layer (layer 2: data link layer) of an OSI reference model, and the packet is a common name of the PDU used in communication at a third layer (layer 3: network layer) of the OSI reference model. Here, the frame is a frame that carries the packet. That is, according to the present invention, the frame can be read interchangeably as the packet.

To offer the conventional network service, the CPU 300 executes processing related to the conventional network service protocol. The memory 350 stores data processed by the CPU 300. The conventional network service is a service conventionally dealt by the switching node 10 and is processing completed within the switching node 10. That is, the CPU 300 is a CPU that addresses internal processing. Examples of the conventional network service include conventional frame forwarding, packet exchange (switching), routing, and control and setting of the switching node 10.

The CPU 400 executes processing for cooperating with the external control server 20 that offers the extended network service. The memory 450 stores data processed by the CPU 400. The extended network service is a service dependent on the external control server 20 and is processing completed through cooperation of the switching node 10 and the external control server 20. That is, the CPU 400 is a CPU that addresses external cooperation. Examples of the extended network service include path control by external control, firewall processing and load balancing.

A plurality of CPUs 300, a plurality of memories 350, a plurality of CPUs 400 and a plurality of memories 450 may be provided.

An internal configuration of the switching node 10 may be integrated. For example, in recent years, a microcomputer has been integrated into one chip. Accordingly, a case can be contemplated in which the 1-chip microcomputer mounted in the switching node 10 includes the network switch forwarding engine 100, the PCI express (PCI Express) switch 200, the CPU 300, the memory 350, the CPU 400 and the memory 450. Moreover, a case can be contemplated in which, in existing network equipment, a configuration shown in FIG. 3 is logically realized by a VM (Virtual Machine) environment. The configuration shown in FIG. 3 is a conceptual configuration and is not limited to a physical configuration.

The control server 20 includes a network interface 500, a CPU 600 and a memory 650.

The network interface 500 transmits/receives the frame to/from the switching node 10. The CPU 600 executes processing related to extended network service and protocol. The memory 650 stores data processed by the CPU 600.

[Differences Between this System Configuration and Conventional System Configuration]

Comparing FIG. 1 with FIG. 3, it is apparent that the communication control system of the present invention is different from the conventional system configuration in that the switching node 10 has two CPUs. Further detailed differences will be described later.

[Main Points of Configuration]

The network switch forwarding engine 100 includes a PCI express (PCI. Express) and LAN (Local Area Network) interfaces to switch destination of the frame according to the type of the input frame. That is, the network switch forwarding engine 100 checks the type of the input frame and determines the destination of the frame according to a check result.

Here, the network switch forwarding engine 100 includes LAN interfaces (1 G MAC) 101, 102, 103, a LAN interface (10 G MAC) 104 and a LAN interface (10 G MAC) 106, as LAN interfaces. The network switch forwarding engine 100 further includes a PCI express end point (PCI Express End Point) 105 as the PCI express end point.

The "LAN interface (1 G MAC)" means a LAN interface that supports data transfer of 1 Gbps. Similarly, the "LAN interface (10 G MAC)" means a LAN interface that supports data transfer of 10 Gbps. It is noted that "1 G" and "10 G" are merely examples.

Except for special applications, most LANs are currently Ethernet (registered mark). Examples of the LAN interface include a network card such as the NIC (Network Interface Card). At this time, for the conventional network service, the destination of the frame is switched to the PCI express (PCI Express). The CPU 300 is provided ahead of the PCI express (PCI Express). For the extended network service that cooperates with the external control server 20, the destination of the frame is switched to the LAN interface. The CPU 400 is provided ahead of the LAN interface. When the frame is forwarded to the LAN interface, search result information, input port information and the like are added to the frame.

The CPU 300 includes the PCI express (PCI Express).

Here, the CPU 300 has a PCI express root complex (PCI Express Root Complex) 301 as the PCI express (PCI Express).

The CPU 300 collects the frames destined for the CPU 300, which are accumulated in the network switch forwarding engine 100, as the root complex, and executes the conventional network service.

The CPU 400 includes the PCI express (PCI Express) and a LAN interface.

Here, the CPU 400 has a LAN interface (10 G MAC) 401 as the LAN interface. The CPU 400 further has a PCI express end point (PCI Express End Point) 402 as the PCI express (PCI Express).

The CPU 400 acquires information for inquiring of the control server 20 about the frame received from the network switch forwarding engine 100, analyzes and converts the information about the frame so as not to affect a network protocol on the operation system, and transmits/receives the frame at high speed by using the LAN interface, not the PCI express (PCI Express).

Since the LAN interface (10 G MAC) having the same standard as that of the external connecting interface is used in a switching node, the frame in the same format passes at the same communication speed between the CPU 400 and the network switch forwarding engine 100, and between the network switch forwarding engine 100 and the external control server 20. That is, the network switch forwarding engine 100 can achieve forwarding of the frame between the CPU 400 and the external control server 20 without performing analysis and conversion of the information about the frame.

The CPU 400 holds the received frame in the memory 450 until a response from the external control server 20 is made, and when inquiring of the external control server 20 about the service, utilizes cryptography processing used in the SSL (Secure Socket Layer) and the like, and the network protocol such as TCP/IP (Transmission Control Protocol/Internet Protocol) to communicate with the external control server 20 at high speed via the LAN interface.

The control server 20 receives the frame via the LAN interface, executes the extended network service and returns a response to the switching node 10.

The CPU 400 receives the response from the control server 20 via the LAN interface and then, performs setting necessary for the extended network service to the network switch forwarding engine 100 by means of the PCI express (PCI Express).

Although the PCI express (PCI Express) and the LAN interfaces are described herein, the present invention is not actually limited to these examples. As a matter of course, the PCI express (PCI Express) and the LAN interfaces can be replaced with their equivalents. At least in the switching node 10, essentially, the PCI express (PCI Express) is a "first internal bus" and the LAN interface is a "second internal bus". The "second internal bus" is different from the "first internal bus" in standards and can perform data transfer of a larger capacity and at higher speed than the "first internal bus". The "second internal bus" is used for transfer of data to be transmitted to the outside of the switching node 10.

[Examples of Hardware]

Examples of the terminals 1 to 3 and the control server 20 include computers such as a PC (personal computer), an appliance (appliance), a thin client terminal/server, a work station, a main frame and a supercomputer.

The CPU 300, the CPU 400 and the CPU 600 are mere examples of the processor. The CPU 300, the CPU 400 and the CPU 600 each may be a microprocessor (microprocessor), a microcontroller or an IC (Integrated Circuit) having similar functions.

Examples of the memory 350, the memory 450 and the memory 650 include semiconductor storage devices such as a RAM (Random Access Memory), a ROM (Read Only Memory), an EEPROM (Electrically Erasable and Programmable Read Only Memory) and a flash memory, auxiliary storage devices such as an HDD (Hard Disk Drive) and an SSD (Solid State Drive), or storage media (media) such as a removable disc including a DVD (Digital Versatile Disk) and an SD memory card (Secure Digital memory card).

Examples of the network switch forwarding engine 100 includes a semiconductor integrated circuit such as a LAN-compatible board (mother board, I/O board), a network adaptor such as an NIC (Network Interface Card) or a similar extension card. Here, to achieve high-speed processing by hardware, it is assumed that a network processor (network processor) is mounted in the network switch forwarding engine 100.

However, in fact, the present invention is not limited to these examples.

[Relation with Open Flow (Open Flow) Technique]

According to an open flow (Open Flow) technique, the control server 20 as a controller controls a communication path (path) in the system. The open flow technique is a technique in which the controller sets path information on multi-layers and flow unit to a switch according to a routing policy to perform path control and node control.

According to the open flow technique, the controller monitors the switch in the network and dynamically sets a packet distribution path to the switch in the network according to a communication state. Thereby, a path control function is separated from a router and the switch, and centralized control of the controller enables optimum routing traffic management. The switch that adopts the open flow technique deals with communication as a flow of end-to-end (End to End), not the unit of the packet or the frame as in the conventional router and switch.

For example, the control server 20 controls operations of the switching node 10 (for example, a relay operation of packet data) by registering a flow entry in a flow table of the switching node 10.

The flow entry that defines predetermined processing (action) to be performed for the packet satisfying a predetermined match condition (rule) is registered in the flow table. A group of the packets satisfying the rule (packet string) is called as a flow.

The rule of the flow is defined based on various combinations using any or all of a destination address (Destination Address), a source address (Source Address), a destination port (Destination Port) and a source port (Source Port) that are contained in a header region in each protocol hierarchy of the packet, and can be distinguished. It is assumed that the above-mentioned address includes a MAC address (Media Access Control Address) and an IP address (Internet Protocol Address). In addition, information on an ingress port (Ingress Port) can be used as a flow rule.

An action of the flow is generally packet forwarding to a predetermined forwarding destination. As a matter of course, packet disposal can be designated as the flow action.

Details of the open flow technique are described in Non-patent literatures 1, 2.

[Configuration of Network Switch Forwarding Engine]

Figure 4:
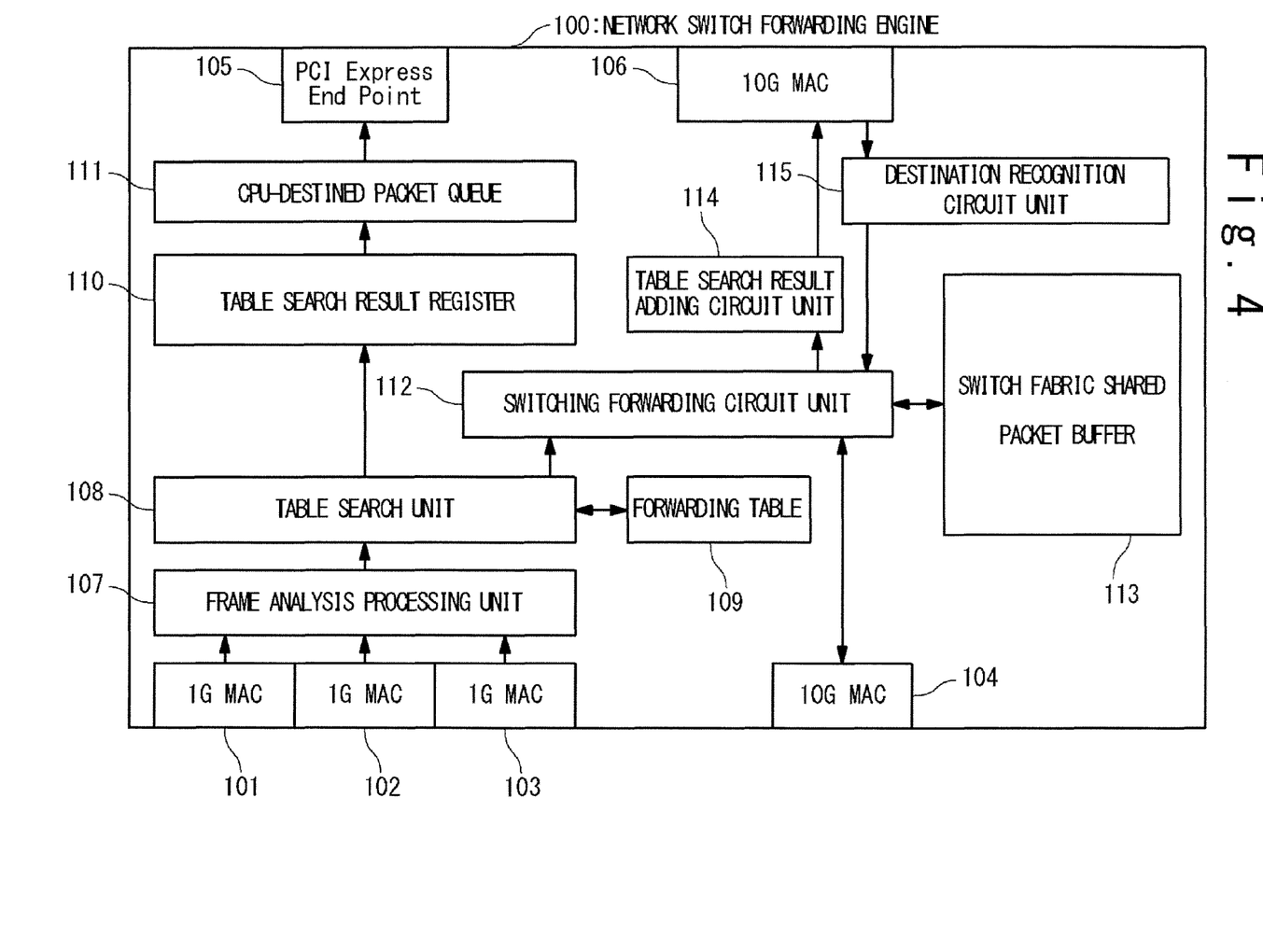
FIG. 4 is a conceptual view showing an example of a configuration of a network switch forwarding engine of the present invention.

FIG. 4 shows an example of a configuration of the network switch forwarding engine 100. The configuration may be a software configuration realized by a program or the like, or may be a hardware configuration realized by a circuit or the like.

The network switch forwarding engine 100 includes the LAN interfaces (1 G MAC) 101, 102, 103, the LAN interface (10 G MAC) 104, the PCI express end point (PCI Express End Point) 105, the LAN interface (10 G MAC) 106, a frame analysis processing unit 107, a table search unit 108, a forwarding table 109, a table search result register 110, a CPU-destined packet queue 111, a switching forwarding circuit unit 112, a switch fabric shared packet buffer 113, a table search result adding circuit unit 114 and a destination recognition circuit unit 115.

The LAN interfaces (1 G MAC) 101, 102, 103 are provided to receive the frame from the terminals 1 to 3, respectively.

The LAN interface (10 G MAC) 104 is provided to communicate with the control server 20. Here, for simplification of description, only the control server 20 is shown as an object connected to the LAN interface (10 G MAC) 104, but in fact, a plurality of ports of the LAN interface (10 G MAC) 104 exist, and other server or switching node may be connected to the LAN interface (10 G MAC) 104.

The PCI express end point (PCI Express End Point) 105 is provided to communicate with the CPU 300.

The LAN interface (10 G MAC) 106 is provided to communicate with the CPU 400.

The frame analysis processing unit 107 analyzes the received frame. Based on an analysis result of the frame, the table search unit 108 refers to the forwarding table 109 to search the destination (forwarding address) of the frame. The forwarding table 109 stores information on the destination (forwarding address) of the frame. Here, the forwarding table 109 is the flow table according to the open flow technique. The table search unit 108 detects the corresponding flow entry from the forwarding table 109 on the basis of various types of information contained in a header region of the frame, and determines the destination (forwarding address) of the frame according to the action defined in the flow entry.

The table search result register 110 holds a search result of the forwarding table about the frame destined for the CPU 300 leading to the PCI express (PCI Express). Here, the table search result register 110 holds the search result of the forwarding table 109 about the destination (forwarding address) of the frame. The CPU-destined packet queue 111 is provided to perform queuing (queuing) of the frame at transmission/reception of the frame to/from the CPU 300.

The switching forwarding circuit unit 112 executes the frame switching forwarding processing in the network switch forwarding engine 100. The switch fabric shared packet buffer 113 is provided to perform buffering (buffering) at forwarding of the frame.

A data format at queuing and buffering may be a frame format or a packet format. It is due to that, even when the packet format is used, at transmission via the PCI express (PCI Express) or the LAN interface, the packet format is converted into the frame format.

Since the table search result adding circuit unit 114 transmits the search result to the CPU 400, the search result is added to the frame and this frame is outputted to the LAN interface 106. The destination recognition circuit unit 115 recognizes transfer from the CPU 400 to any destination.

[Configuration of CPU that Executes Conventional Network Service]

Figure 5:
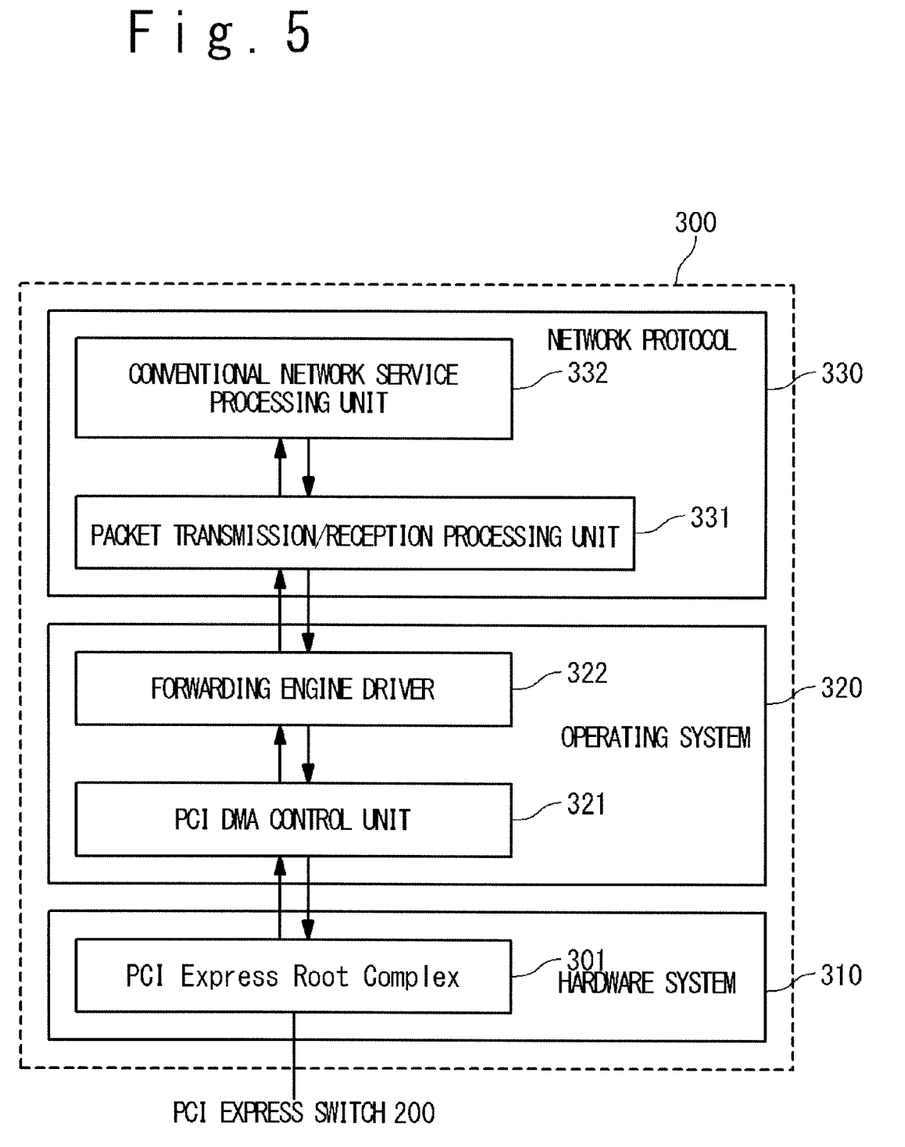
FIG. 5 is a conceptual view showing an example of a configuration of a CPU that executes a conventional network service according to the present invention.

FIG. 5 shows an example of a configuration of the CPU 300. The configuration may be a software configuration realized by a program or the like, or may be a hardware configuration realized by a circuit or the like.

The CPU 300 includes a hardware system 310, an operating system 320 and a network protocol 330.

The hardware system 310 has the PCI express root complex (PCI Express Root Complex) 301.

The PCI express root complex (PCI Express Root Complex) 301 is provided to communicate with the network switch forwarding engine 100 via the PCI express (PCI Express) switch 200. The PCI express root complex (PCI Express Root Complex) 301 is a PCI express (PCI Express) device and functions as a root complex.

The operating system 320 includes a PCI DMA control unit 321 and a forwarding engine driver 322.

The PCI DMA control unit 321 performs DMA (Direct Memory Access) transfer control of the network switch forwarding engine 100 via the PCI express (PCI Express) switch 200 by use of the PCI express (PCI Express) device. The forwarding engine driver 322 is provided to control the network switch forwarding engine 100 via the PCI express (PCI Express). Here, the forwarding engine driver 322 uses the PCI DMA control unit 321. The PCI DMA control unit 321 may be one function of the forwarding engine driver 322.

The network protocol 330 includes a packet transmission/reception processing unit 331 and a conventional network service processing unit 332.

Using the forwarding engine driver 322, the packet transmission/reception processing unit 331 performs frame transmitting/receiving processing with the network switch forwarding engine 100 via the PCI express (PCI Express) switch 200. Here, using the forwarding engine driver 322 and the PCI DMA control unit 321, the packet transmission/reception processing unit 331 performs the DMA transfer control of the network switch forwarding engine 100 and requests/collects the frames accumulated in the CPU-destined packet queue 111. The packet transmission/reception processing unit 331 converts the frame received from the forwarding engine driver 322 into the packet format. The conventional network service processing unit 332 performs processing related to the conventional service protocol of the packet received from the packet transmission/reception processing unit 331.

Further, the packet transmission/reception processing unit 331 converts the packet received from the conventional network service processing unit 332 into the frame format, and transmits the frame to the network switch forwarding engine 100 via the PCI express (PCI Express) switch 200 by use of the forwarding engine driver 322.

[Configuration of CPU that Executes Processing Related to Extended Network Service]

Figure 6:
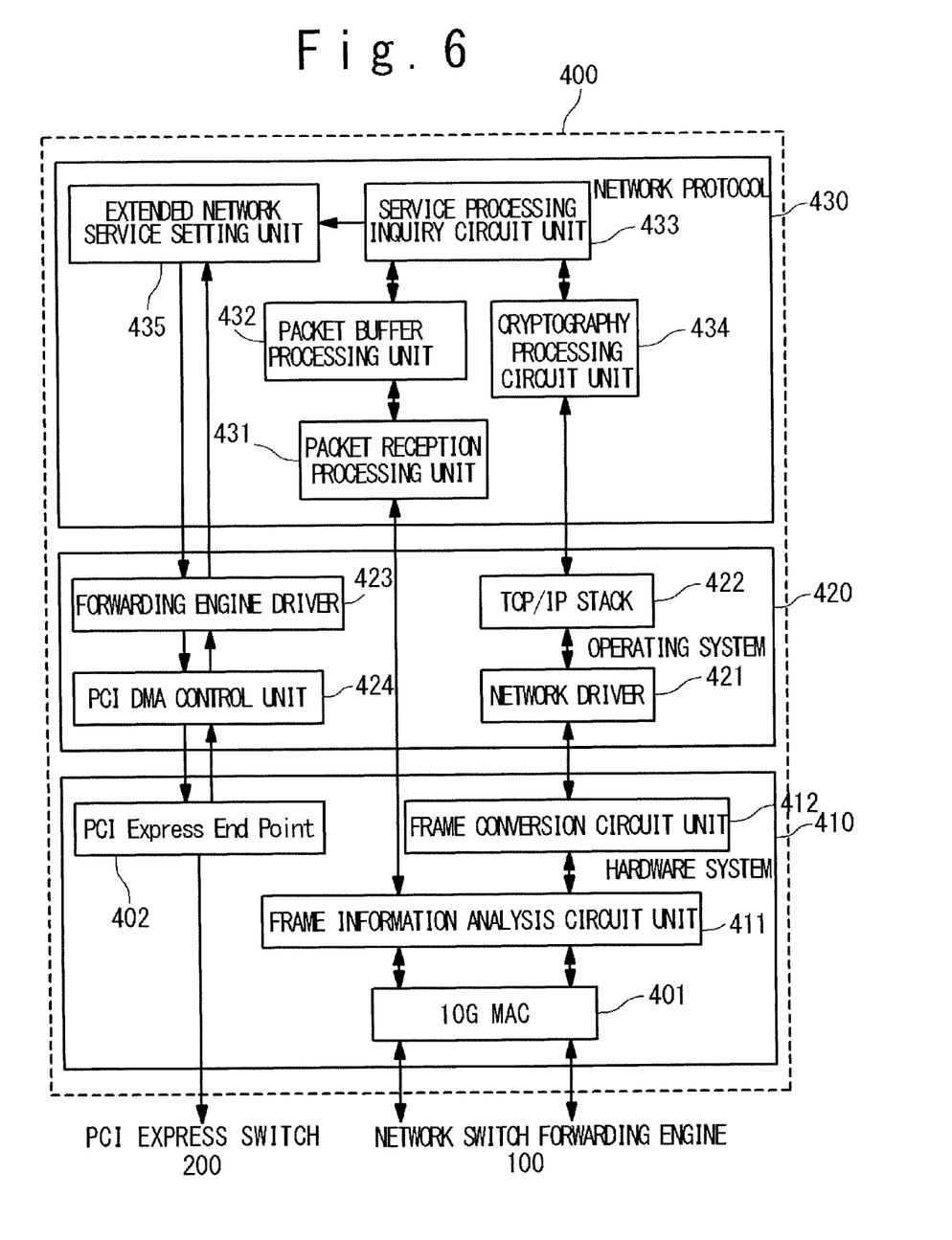
FIG. 6 is a conceptual view showing an example of a configuration of a CPU that executes processing related to an extended network service according to the present invention.

FIG. 6 shows an example of a configuration of the CPU 400. The configuration may be a software configuration realized by a program or the like, or may be a hardware configuration realized by a circuit or the like.

The CPU 400 includes a hardware system 410, an operating system 420 and a network protocol 430.

The hardware system 410 includes the LAN interface (10 G MAC) 401, the PCI express end point (PCI Express End Point) 402, a frame information analysis circuit unit 411 and a frame conversion circuit unit 412.

The LAN interface (10 G MAC) 401 is provided to receive the frame from the network switch forwarding engine 100 and transmits/receives the frame to/from the control server 20.

The PCI express end point (PCI Express End Point) 402 is provided to communicate with the network switch forwarding engine 100 via the PCI express (PCI Express) switch 200. The PCI express end point (PCI Express End Point) 402 is a PCI express (PCI Express) device and functions as an end point.

The frame information analysis circuit unit 411 is provided to analyze internal information (ex. header information) on the frame received from the network switch forwarding engine 100. The frame conversion circuit unit 412 is provided to prevent an impact on a network protocol stack on the operating system.

The operating system 420 includes a network driver 421, a TCP/IP stack 422, a forwarding engine driver 423 and a PCI DMA control unit 424.

The network driver 421 is provided to transmit/receive the frame via the LAN interface (10 G MAC) 401. The TCP/IP stack 422 is provided to perform protocol communication with the control server. The forwarding engine driver 423 is provided to control the network switch forwarding engine 100 via the PCI express (PCI Express). Using the PCI express (PCI Express) device, the PCI DMA control unit 424 performs DMA transfer control of the network switch forwarding engine 100 via the PCI express (PCI Express) switch 200.

The network protocol 430 includes a packet reception processing unit 431, a packet buffer processing unit 432, a service processing inquiry circuit unit 433, a cryptography processing circuit unit 434 and an extended network service setting unit 435.

The packet reception processing unit 431 is provided to receive the frame in the packet format from the frame conversion circuit unit 412. The packet buffer processing unit 432 is provided to buffer the packet received from the packet reception processing unit 431 once to wait for control by the control server 20. The service processing inquiry circuit unit 433 is provided to inquire of the control server 20. The cryptography processing circuit unit 434 is provided to execute cryptography processing at inquiry for the control server 20/response of an inquiry result. The extended network service setting unit 435 is provided to set the network switch forwarding engine 100 via the PCI express (PCI Express) switch 200 according to the inquiry result for the control server 20.

Examples of setting of the network switch forwarding engine 100 include registration and updating of the flow table (or the flow entry) according to the open flow technique.

[Differences Between this CPU Configuration and Conventional CPU Configuration]

Comparing FIGS. 2, 5 and 6, it is apparent that the configuration of the CPUs of the present invention is different from that of the conventional CPU in that the two CPUs execute the processing related to the conventional network service and the processing related to the extended network service, respectively. According to the present invention, the CPUs do not need to execute the distribution and priority control processing. Further, according to the present invention, the packet subjected to the processing related to the conventional network service, and the packet subjected to the processing related to the extended network service do not use the same interface. For this reason, delay at packet transmission/reception, overflow of the CPU-destined packet queue (queue), disposition of the packet and decline in the service quality less occur than conventional. This can improve performances of the switching node.

[Configuration of CPU on Conventional Switching Node]

For comparison with the present invention, an example of the configuration of the CPU on the conventional switching node will be described referring to FIG. 2. Components having the same name in FIGS. 2, 5 and 6 are basically identical.

As shown in FIG. 2, on the conventional switching node, the CPU 300 includes the hardware system 310, the operating system 320 and the network protocol 330.

The hardware system 310 includes a PCI express root complex (PCI Express Root Complex) 301.

The operating system 320 includes the PCI DMA control unit 321, the forwarding engine driver 322, a distribution and priority control processing unit 323, a network driver 324 and a TCP/IP stack 325.

In the operating system 320, the CPU 300 on the conventional switching node further includes the distribution and priority control processing unit 323, the network driver 324 and the TCP/IP stack 325.

The distribution and priority control processing unit 323 executes either distribution and priority control processing for executing the processing related to the conventional network service or the processing related to the extended network service, with respect to the received frame. The network driver 324 has the same function as the network driver 421 in FIG. 6. The TCP/IP stack 325 has the same function as the TCP/IP stack 422 in FIG. 6.

The network protocol 330 includes the packet transmission/reception processing unit 331, the conventional network service processing unit 332, a packet reception processing unit 333, a packet buffer processing unit 334, a service processing inquiry circuit unit 335, an cryptography processing circuit unit 336 and an extended network service setting unit 337.

In the network protocol 330, the CPU 300 on the conventional switching node further includes the packet reception processing unit 333, the packet buffer processing unit 334, the service processing inquiry circuit unit 335, the cryptography processing circuit unit 336 and the extended network service setting unit 337.

The packet reception processing unit 333 has the same function as that of the packet reception processing unit 431. The packet buffer processing unit 334 has the same function as that of the packet buffer processing unit 432. The service processing inquiry circuit unit 335 has the same function as that of the service processing inquiry circuit unit 433. The cryptography processing circuit unit 336 has the same function as that of the cryptography processing circuit unit 434. The extended network service setting unit 337 has the same function as that of the extended network service setting unit 435.

At this time, when the processing related to the conventional network service is executed with respect to the received frame, the distribution and priority control processing unit 323 transmits the received frame to the packet transmission/reception processing unit 331.

When the processing related to the extended network service is executed with respect to the received frame, the distribution and priority control processing unit 323 transmits the received frame to the packet reception processing unit 333.

Further, the distribution and priority control processing unit 323 applies the distribution and priority control processing to both the packet based on the conventional network service and the packet based on the extended network service, and transmits the packets to the network switch forwarding engine 100 via the PCI express (PCI Express) switch 200 by use of the forwarding engine driver 322

In this manner, the distribution and priority control processing unit 323 mitigates congestion in the PCI express (PCI Express) as the only interface connecting the conventional CPU 300 to the network switch forwarding engine 100.

[Configuration of Control Server]

Figure 7:
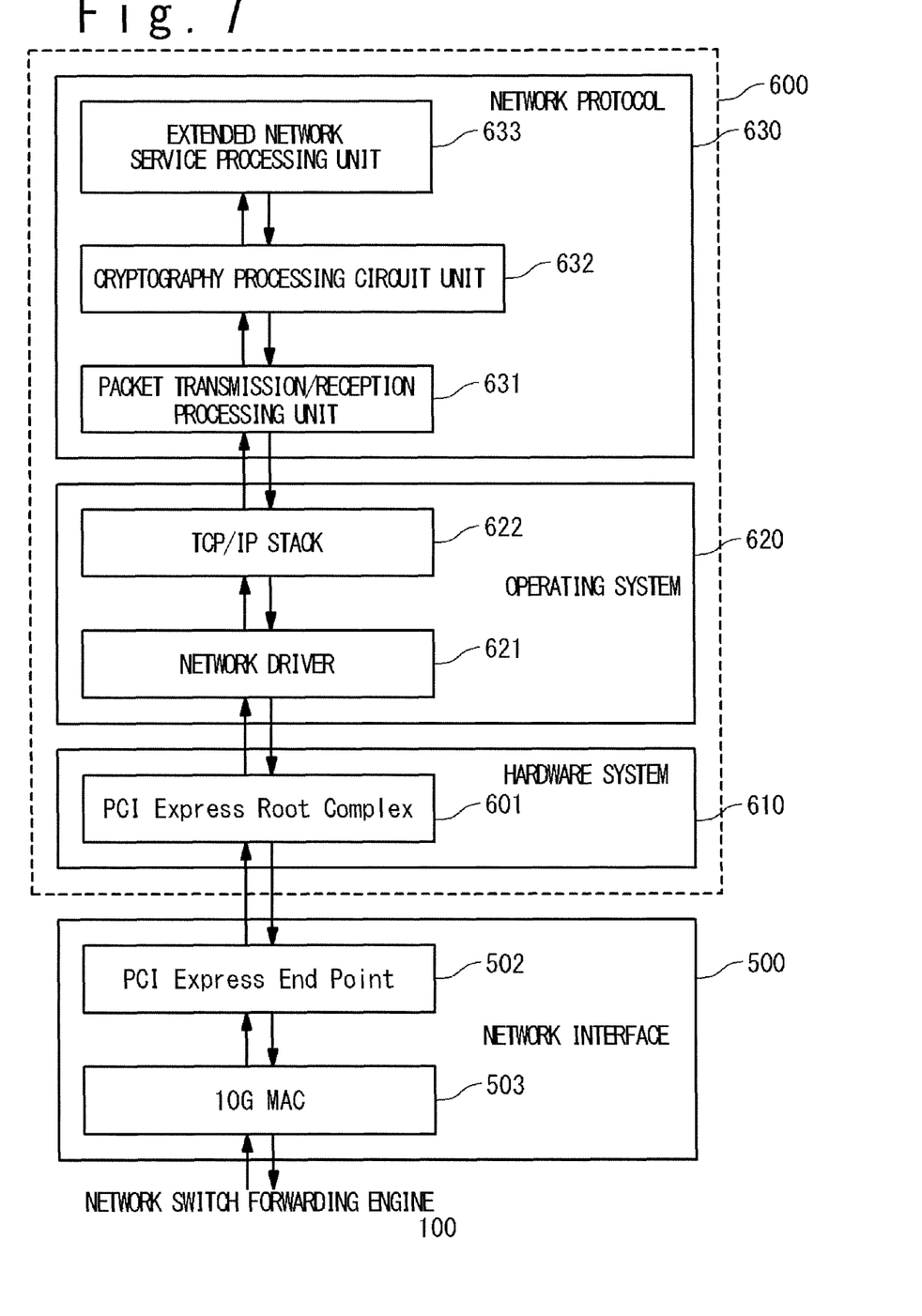
FIG. 7 is a conceptual view showing an example of a configuration of a control server of the present invention.

FIG. 7 shows an example of a configuration of the control server 20. The configuration may be a software configuration realized by a program or the like, or may be a hardware configuration realized by a circuit or the like.

The control server 20 includes the network interface 500 and the CPU 600.

The network interface 500 includes a LAN interface (10 G MAC) 501 and a PCI express end point (PCI Express End Point) 502.

The LAN interface (10 G MAC) 501 is provided to communicate with the switching node 10.

PCI express end point (PCI Express End Point) 502 is provided to communicate with the CPU 600. The PCI express end point (PCI Express End Point) 502 is a PCI express (PCI Express) device and functions as en end point.

The CPU 600 includes a hardware system 610, an operating system 620 and a network protocol 630.

The hardware system 610 includes a PCI express root complex (PCI Express Root Complex) 601.

The PCI express root complex (PCI Express Root Complex) 601 is provided to communicate with the network interface 500. The PCI express root complex (PCI Express Root Complex) 601 is a PCI express (PCI Express) device and functions as a root complex.

The operating system 620 includes a network driver 621 and a TCP/IP stack 622.

The network driver 621 controls the network interface 500. The TCP/IP stack 622 is provided to perform protocol communication with the switching node 10.

The network protocol 630 includes a packet transmission/reception processing unit 631, cryptography processing circuit unit 632 and an extended network service processing unit 633.

The packet transmission/reception processing unit 631 transmits/receives the frame in the packet format to/from the switching node 10. At transmission/reception of the frame in the transmission/reception processing unit 631, the cryptography processing circuit unit 632 executes cryptography processing. The extended network service processing unit 633 offers the service and the protocol that are implemented on the control server.

[Basic Operation]

Next, operations in the present embodiment will be described referring to FIGS. 3, 4, 5, 6 and 7.

[Operation at Reception of Frame from Terminal]

The LAN interfaces (1 G MAC) 101, 102, 103 of the network switch forwarding engine 100 of the switching node 10 receive various frames from the terminal 1, the terminal 2 and the terminal 3, respectively, via the network. The frame analysis processing unit 107 analyzes a header of the frame in the network switch forwarding engine 100. Next, to determine a forwarding method of the frame, the table search unit 108 searches and refers to the forwarding table 109 and confirms processing (action) applied to the frame.

[Processing of Frame]

Processing of the frame is roughly divided into following three types.

[Processing 1]

In the first processing, a destination and a processing method are previously described in the forwarding table 109 according to the service or the protocol. In this case, the switching forwarding circuit unit 112 executes switching processing to the destination according to the description, and forwards the frame to the outside.

[Processing 2]

In the second processing, a frame using the conventional network service is newly entered. In this case, the table search unit 108 stores input port information and a table search result in the table search result register 110 as well as stores the frame in the packet format in the CPU-destined packet queue 111. When the frame in the packet format is stored in the CPU-destined packet queue 111, the network switch forwarding engine 100 sends an interrupt notification to the CPU 300 connected to the PCI express (PCI Express) to notify that the frame is stored. In order that the CPU 300 connected ahead of the PCI express (PCI Express) receives the frame, the forwarding engine driver 322 performs DMA control of the network switch forwarding engine 100 by use of the PCI DMA control unit 321. The packet transmission/reception processing unit 331 performs frame receiving processing in the packet format. The conventional network service processing unit 332 analyzes the packet from the packet transmission/reception processing unit 331. When receiving an analysis result from the conventional network service processing unit 332, the packet transmission/reception processing unit 331 transmits the frame based on the analysis result to the outside by use of the PCI express (PCI Express) again. Alternatively, the packet transmission/reception processing unit 331 performs setting of the network switch forwarding engine 100 for a frame to be subsequently received by use of the PCI express (PCI Express).

[Processing 3]

In the third processing, a frame using the extended service protocol via the control server 20 is newly entered. In this case, input port information and a table search result together with the frame are transmitted to the table search result adding circuit unit 114 via the switching forwarding circuit unit 112 and the switch fabric shared packet buffer 113. The table search result adding circuit unit 114 stores the input port information and the table search result in the frame, and forwards them as they are to the CPU 400 via the LAN interface (10 G MAC) 106. In transmitting the frame via the LAN interface (10 G MAC) 106, when the frame cannot be transmitted due to the flow control of the LAN and so on, the switching forwarding circuit unit 112 buffers the frame in the switch fabric shared packet buffer 113. Thereby, when a load of the input frame is higher than a capacity of the connected CPU, disposal of the frame can be suppressed to minimum.

[Operation at Use of Extended Network Service]

When the frame received from each of the terminals 1 to 3 cannot be processed in the conventional network service, the network switch forwarding engine 100 transmits the frame to the CPU 400 via the LAN interface (10 G MAC) 106.

The frame information analysis circuit unit 411 of the CPU 400 receives the frame from the network switch forwarding engine 100 via the LAN interface (10 G MAC) 401. The frame information analysis circuit unit 411 analyzes information stored in the frame. The packet reception processing unit 431 receives the frame in the packet format from the frame information analysis circuit unit 411 at high speed. The packet buffer processing unit 432 buffers the frame in the packet format. After that, to check a frame processing procedure, the service processing inquiry circuit unit 433 executes inquiring processing for the control server 20.

[Operation at Inquiry to Control Server]

At inquiry for the control server 20 by the service processing inquiry circuit unit 433, the cryptography processing circuit unit 434 executes frame cryptography processing as needed, and starts communication with the control server 20 via the network driver 421 by use of the TCP/IP stack 422 on the operating system 420.

When the network driver 421 starts transmission of the frame, the frame conversion circuit unit 412 adds a control header to the frame to transmit the frame to any port of the network switch forwarding engine 100.

The destination recognition circuit unit 115 of the network switch forwarding engine 100 recognizes the control header of the received frame and peels off (deletes) the control header, and then, forwards the frame to the designated port of the LAN interface (10 G MAC) 104 through the switching forwarding circuit unit 112. The control server 20 is connected ahead of the designated port.

[Operation of Control Server]

The control server 20 performs control to forward the frame to be received by the switching node 10 subsequently (from this time) in an optimum path, and control to allow the switching node 10 to cooperate with the control server 20, thereby improving the network service.

The control server 20 receives an inquiry frame from the switching node 10 via the LAN interface (10 G MAC) 501 controlled by the network driver 621 on the operating system 620. The TCP/IP stack 622 processes the received frame and sends the frame to the extended network service processing unit 633 via the packet transmission/reception processing unit 631 and the cryptography processing circuit unit 632 of the network protocol 630.

The extended network service processing unit 633 executes protocol processing on the basis of information on the inquiry frame from the switching node 10, and returns frame destination information and frame control information to the switching node 10 via the operating system 620 and the network interface 500.

[Operation after Response from Control Server]

The LAN interface (10 G MAC) 104 of the network switch forwarding engine 100 of the switching node 10 receives the frame returned from the control server 20, and transmits it to the CPU 400 via the network switch forwarding engine 100 and the LAN interface (10 G MAC) 106 without any overhead.

The frame transmitted to the CPU 400 is sent to the service processing inquiry circuit unit 433 via the LAN interface (10 G MAC) 401, the frame information analysis circuit unit 411, the frame conversion circuit unit 412, the network driver 421, the TCP/IP stack 422 and the cryptography processing circuit unit 434.

Upon forwarding the sent frame to the designated destination according to a control content, the service processing inquiry circuit unit 433 adds the destination information to the frame via the LAN interface (10 G MAC) 401, not the PCI express (PCI Express), and transmits the frame to the network switch forwarding engine 100.

The LAN interface (10 G MAC) 106 receives the frame from the service processing inquiry circuit unit 433. The destination recognition circuit unit 115 recognizes the destination of the frame and transmits the frame to the switching forwarding circuit unit 112. The switching forwarding circuit unit 112 forwards the frame to the designated destination via the LAN interfaces (1 G MAC) 101, 102, 103 and the LAN interface (10 G MAC) 104.

When the control content is a control instruction for a specific frame, the service processing inquiry circuit unit 433 transmits setting information to the extended network service setting unit 435. The extended network service setting unit 435 performs setting of the forwarding table 109 and operational setting of the network switch forwarding engine 100 via the PCI express (PCI Express) switch 200 by use of the forwarding engine driver 423, the PCI DMA control unit 424, the PCI express end point (PCI Express End Point) 402 and the PCI express (PCI Express) switch 200.

Concerning the control, by using the PCI express (PCI Express) as in the CPU 300, setting can be easily achieved without limitation as conventional.

As described above, according to the present invention, by mixing the high-speed interface of 10 G level (transfer rate of 10 Gbps) and the conventional control interface based on the PCI express (PCI Express), it is possible to configure the switching node that uses the external control server and achieves the high-speed and advanced service while minimizing an impact on the software.

Conventionally, only the PCI and the PCI express (PCI Express) are used as the interface for control information. However, according to the present invention, by providing the control server outside and, in order to enable high-speed data exchange on the control interface, by adding the control information on the LAN and configuring the control line via the PCI express (PCI Express) and the frame transfer line based on the MAC header information in the switching node, control conventionally performed within the conventional network device can be efficiently performed in the outside.

As the present invention, by mixing the high-speed interface of 10 G level and the conventional control interface based on the PCI express (PCI Express), it is possible to configure the switching node that uses the external control server and achieves the high-speed and advanced service while minimizing an impact on the software.

APPLICATION OF THE PRESENT INVENTION

The present invention is not limited to the above-mentioned embodiment, and can also be applied to a device of only extending the function of the switching node in a configuration having no external control server.

SUMMARY

The present invention relates to the node configuration in the network switching node, which uses the external control server and configures the higher-speed and more advanced service protocol without having an effect of lowering performances of the conventional service protocol processing.

In FIG. 3, in the system configured of the switching node 10 and the control server 20, the control frame can be exchanged between the switching node and the control server at high speed, thereby providing a function capable of achieving the higher-speed and more advanced service protocol processing function on the control server 20.

In FIG. 3, in the case of the conventional service, the control frame transmitted from the network forwarding engine 401 is transmitted to the CPU 300 by use of the interface of PCI express end point (PCI Express End Point) 105, and the conventional service processing is executed.

On the other hand, when the control server is used, the control frame is transmitted at high speed by use of the LAN interface (10 G MAC) 106 suited to transmit/receive the network frame without using the PCI express (PCI Express).

The CPU 400 receives the control frame and executes the cryptography processing of the frame and then, transmits the control frame to the control server 20 via the LAN interface (10 G MAC) 401 again, and executes the extended network service performed on the CPU 600.

The CPU 600 that performs the extended network service returns a response to the switching node 10 as needed.

The CPU 400 of the switching node 10 uses either the LAN interface (10 G MAC) 401 or the PCI express end point (PCI Express End Point) 402 according to a response content. Here, the CPU 400 transfers the packet using the LAN interface (10 G MAC) 401 and the network switch forwarding engine 100, or sets control necessary for the service of the network switch forwarding engine 100 via the PCI express (PCI Express) switch 200 using the PCI express end point (PCI Express End Point) 402.

Accordingly, according to the present invention, since the PCI express (PCI Express) used in the conventional network service is not used, high-speed packet transmission/reception is possible and therefore, the advanced and high-speed network service that cooperates with the control server 20 becomes feasible.

In the conventional system configuration, only one CPU exists on the switching node, and the CPU executes processing related to all service protocols. In the conventional system configuration, the one CPU is connected to the network switch forwarding engine via the PCI express (PCI Express), and operates in cooperation with the external control server via the network switch forwarding engine. That is, in the conventional system configuration, since only the PCI express (PCI Express) is an interface used to connect the one CPU (all internal modules) to the network switch forwarding engine (external connecting device), the internal modules struggle for resources, which requires distribution and priority control processing or the like. When control of the PCI express (PCI Express) is delayed, overflow of the CPU-destined packet queue in the network switch forwarding engine, disposition of the packet and decline in the service quality occur.

On the contrary, in the system configuration of the present invention, the network switch forwarding engine includes the PCI express (PCI Express) and the LAN interface.

According to the type of the input frame, the network switch forwarding engine switches the destination of the frame to the PCI express (PCI Express) for the conventional network service, and to the LAN interface for the extended network service that cooperates with the external control server.

When forwarding the frame to the LAN interface, the network switch forwarding engine adds search result information, input port information and the like to the frame.

The CPU having the PCI express (PCI Express) and the LAN interface is provided as objects connected to the LAN interface of the network switch forwarding engine.

The CPU acquires information for inquiring of the control server about the frame received from the network switch forwarding engine, analyzes and converts the information about the frame so as not to affect a network protocol on the operation system, and transmits/receives the frame at high speed by using the LAN interface, not the PCI express (PCI Express).

Since the LAN interface (10 G MAC) having the same standard as that of the external connecting interface is used in the switching node, the frame in the same format passes at the same communication speed between the CPU and the network switch forwarding engine, and between the network switch forwarding engine and the external control server. That is, the network switch forwarding engine can achieve transfer of the frame between the CPU and the external control server without performing analysis and conversion of the information about the frame.

The above-mentioned CPU holds the received frame in the memory until a response from the external control server is made, and when inquiring of the external control server about the service, utilizes cryptography processing used in the SSL and the network protocol such as TCP/IP to communicate with the external control server at high speed via the LAN interface.

The control server receives the inquiry frame from the switching node via the LAN interface, executes the extended network service and returns a response to the switching node.

The switching node receives the response from the control server via the LAN interface and then, performs setting necessary for the extended network service to the network switch forwarding engine via the PCI express (PCI Express)

INDUSTRIAL APPLICABILITY

The present invention can also be applied to a network device that supports advanced services such as a security server, a firewall and a load balancer. However, in fact, the present invention is not limited to these examples.

Although the embodiment of the present invention has been described in detail, the present invention is not limited to the above-mentioned embodiment and changes that do not deviate from the subject matter of the present invention are contained in the present invention.

NOTE

This application claims a priority based on Japanese Patent Application No. 2010-036416 and contents disclosed in Japanese Patent Application No. 2010-036416 are incorporated herein by reference.

The invention claimed is:

1. A communication control system, comprising:
   a switching node configured to execute a first network service; and
   a control server configured to execute a second network service,
   wherein said switching node comprises:
      a first processor;
      a second processor;
      a PCI express (Peripheral Component Interconnect Express) switch for forwarding a frame for said first processor;
      a first LAN (Local Area Network) interface for forwarding a frame for said control server;
      a second LAN interface for forwarding a frame for said second processor; and
      a forwarding engine configured:
         to include a flow table;
         to input a first frame, which includes a header including at least one data;
         to analyze the first frame based on the data included in the first frame;
         to refer to the flow table based on an analysis result of the first frame for determining a transferring destination of the first frame;
         to forward the first frame regarding said first network service to said PCI express switch for internal processing in said first processor, if a result of the referring to the flow table indicates said first network service; and
         to forward the first frame regarding said second network service to said second LAN interface for outputting the first frame to said second processor, if the result of the referring to the flow table indicates said second network service, and
      wherein said second processor is configured:
         to input a second frame;
         to output the second frame to said control server through said second LAN interface, said forwarding engine and said first LAN interface; and
         to control a setting of the flow table controlled by said control server based on the second frame.

2. The communication control system according to claim 1, wherein said second processor comprises:
   a unit that obtains information for inquiring of said control server with respect to a frame received from said forwarding engine through said first LAN interface and said second LAN interface, and for performing information analysis and conversion of said frame; and
   a unit that inquires said control server through said first LAN interface, said second LAN interface, and said forwarding engine with respect to said received frame, and for configuring setting of said second network service with respect to said forwarding engine through said PCI express switch if receiving a reply from said control server.

3. The communication control system according to claim 1, wherein said at least one data includes an IP address.

4. The communication control system according to claim 1, wherein the first frame indicates a frame which is inputted to an inside of the forwarding engine from the first LAN interface.

5. The communication control system according to claim 1, wherein said control server registers the flow table.

6. The communication control system according to claim 1, wherein the second processor controls the setting of the flow table to determine the transferring destination of the first frame.

7. The communication control system according to claim 1, wherein, with respect to the first network service, a frame transferring is applied between the first processor and the PCI express switch.

8. The communication control system according to claim 7, wherein, with respect to the second network service, the first LAN interface and the second LAN interface are applied between the second processor and the control server.

9. A switching nod; comprising:
   a first processor;
   a second processor;
   a PCI express (Peripheral Component Interconnect Express) switch for forwarding a frame for said first processor;
   a first LAN (Local Area Network) interface for forwarding a frame for a control server;
   a second LAN interface for forwarding a frame for said second processor; and
   a forwarding engine configured:
      to include a flow table;
      to input a first frame, which includes a header including at least one data;
      to analyze the first frame based on the data included in the first frame;
      to refer to the flow table based on an analysis result of the first frame for determining a transferring destination of the first frame;
      to forward the first frame regarding a first network service, executed by the switching node, to said PCI express switch for internal processing in said first processor, if a result of the referring to the flow table indicates said first network service; and
      to forward the first frame regarding a second network service, executed by the control server, to said second LAN interface for outputting the first frame to said second processor, if the result of the referring to the flow table indicates said second network service,
   wherein said second processor is configured:
      to input a second frame;
      to output the second frame to said control server through said second LAN interface, said forwarding engine and said first LAN interface; and
      to control a setting of the flow table controlled by said control server based on the second frame.

10. The switching node according to claim 9, wherein said second processor comprises:
   a unit that obtains information for inquiring of said control server with respect to a frame received from said forwarding engine through said first LAN interface and said second LAN interface, and for performing information analysis and conversion of said frame; and
   a unit that inquires of said control server through said first LAN interface, said second LAN interface, and said forwarding engine with respect to said received frame, and for configuring setting of said second network service with respect to said forwarding engine through said PCI express switch if receiving a reply from said control server.

11. A communication control method, comprising:
executing, by a switching node, a first network service; and
executing, by a control server, a second network service,
wherein said switching node comprises:
- a first processor;
- a second processor;
- a PCI express (Peripheral Component Interconnect Express) switch for forwarding a frame for said first processor;
- a first LAN (Local Area Network) interface for forwarding a frame for said control server;
- a second LAN interface for forwarding a frame for said second processor; and
- a forwarding engine configured to include a flow table, the forwarding engine being configured for:
  - inputting a first frame, which includes a header including at least one data;
  - analyzing the first frame based on the data included in the first frame;
  - referring to the flow table based on an analysis result of the first frame for determining a transferring destination of the first frame;
  - forwarding the first frame regarding said first network service to said PCI express switch for internal processing in said first processor, if a result of the referring to the flow table indicates said first network service; and
  - forwarding the first frame regarding said second network service to said second LAN interface for outputting the first frame to said second processor, if the result of the referring to the flow table indicates said second network service, and
wherein said second processor is configured for:
- inputting a second frame;
- outputting the second frame to said control server through said second LAN interface, said forwarding engine and said first LAN interface; and
- controlling a setting of the flow table controlled by said control server based on the second frame.

12. The communication control method according to claim 11, further comprising:
obtaining, by said second processor, information for inquiring of said control server with respect to a frame received from said forwarding engine through said first LAN interface and said second LAN interface, and performing information analysis and conversion of said frame; and
inquiring, by said second processor, of said control server through said first LAN interface, said second LAN interface, and said forwarding engine with respect to said received frame, and configuring setting of said second network service with respect to said forwarding engine through said PCI express switch if receiving a reply from said control server.

13. A recording medium in which a communication control program causing a switching node to execute the communication control method according to claim 11 is stored.

* * * * *